(12) United States Patent  
Kramer et al.

(10) Patent No.: US 7,636,872 B2  
(45) Date of Patent: Dec. 22, 2009

(54) THREAT EVENT-DRIVEN BACKUP

(75) Inventors: Michael Kramer, Yonkers, NY (US);  
Carl M Carter-Schwendler, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 519 days.

(21) Appl. No.: 11/089,475

(22) Filed: Mar. 23, 2005

(65) Prior Publication Data

US 2006/0218439 A1    Sep. 28, 2006

(51) Int. Cl.  
*G06F 11/00* (2006.01)

(52) U.S. Cl. .......................................... 714/47; 714/13

(58) Field of Classification Search .................. 714/13, 714/21, 54, 47  
See application file for complete search history.

(56) References Cited

U.S. PATENT DOCUMENTS

| | | | | |
|---|---|---|---|---|
| 5,528,755 A * | 6/1996 | Beardsley et al. | ............. | 714/48 |
| 6,546,474 B1 * | 4/2003 | Weigelt | ............. | 711/162 |
| 6,810,396 B1 * | 10/2004 | Blumenau et al. | ............. | 707/5 |
| 6,931,552 B2 * | 8/2005 | Pritchard et al. | ............. | 726/34 |
| 7,100,075 B2 * | 8/2006 | Largman et al. | ............. | 714/13 |
| 7,111,201 B2 * | 9/2006 | Largman et al. | ............. | 714/36 |
| 7,137,034 B2 * | 11/2006 | Largman et al. | ............. | 714/23 |
| 7,240,241 B2 * | 7/2007 | Oka | ............. | 714/19 |
| 7,320,601 B1 * | 1/2008 | Yeh | ............. | 439/62 |
| 2002/0162057 A1 * | 10/2002 | Talagala | ............. | 714/54 |
| 2003/0016462 A1 * | 1/2003 | Gong et al. | ............. | 360/31 |
| 2003/0079158 A1 * | 4/2003 | Tower et al. | ............. | 714/23 |
| 2004/0010732 A1 * | 1/2004 | Oka | ............. | 714/13 |
| 2004/0030850 A1 * | 2/2004 | Plappert | ............. | 711/159 |
| 2004/0054849 A1 * | 3/2004 | Deenadhayalan et al. | ... | 711/112 |
| 2005/0044454 A1 * | 2/2005 | Moshayedi | ............. | 714/54 |
| 2005/0071718 A1 * | 3/2005 | Jarabek et al. | ............. | 714/736 |
| 2005/0144518 A1 * | 6/2005 | Ricart et al. | ............. | 714/13 |
| 2006/0200726 A1 * | 9/2006 | Gittins et al. | ............. | 714/763 |
| 2007/0168715 A1 * | 7/2007 | Herz et al. | ............. | 714/13 |

OTHER PUBLICATIONS

Data Integrity—The Unknown Threat—It Observer, Dwayne Melancon, Jul. 30, 2004.*  
Understanding the Virus Threat and Developing Effective Anti-Virus Policy, Frank Zipfel, Mar. 11, 2002.*

* cited by examiner

*Primary Examiner*—Scott T Baderman  
*Assistant Examiner*—Kamini Patel  
(74) *Attorney, Agent, or Firm*—Workman Nydegger

(57) ABSTRACT

A method and apparatus for backing up data in response to detection of an imminent threat to the integrity of the data stored on the storage component a computing device is disclosed. The storage component may be a hard drive and the imminent threat may be a hard drive failure or a malware threat. In response to the receipt of an imminent threat, data stored on the storage component is copied to a computer-readable media either automatically or in response to user input. The backup procedure is configured by selecting data to backup and a media of storage on which to store the backup. Various sources of threat events are described.

16 Claims, 2 Drawing Sheets

THREAT EVENT-DRIVEN BACKUP

FIELD OF THE INVENTION

The present invention relates to computer software, and more particularly, preserving data in response to detection of an imminent threat to the data integrity of a computing device.

BACKGROUND OF THE INVENTION

Making and storing periodic backup copies of the data stored in the storage component, e.g., the hard drive of a computing device to external data storage media is an important method of ensuring the integrity of the stored data. If the integrity of the stored data is compromised, the data can be restored from the backup copy. Large companies invest in staff, equipment, and storage facilities to regularly make backup copies of the data stored on the computing devices they own and operate. Thanks to other measures for protecting data integrity, it is not often that data needs to be restored from a backup copy. For large companies, the expense of the unused copies can be justified by the insurance they provide.

Some companies and individuals that own and operate computing devices do not have the money or inclination to regularly make backup copies of the data stored on their computing devices. Such companies and individuals are vulnerable to threats to the data integrity of their computing devices. Likewise, companies and individuals that regularly make backup copies are vulnerable to threats to the integrity of the data stored on their computing devices between when backup copies are made. What is needed is a way to reduce the impact of threats to the data integrity on a computing device without incurring either the expenditure of time and money required for regularly making and storing backup copies of the data and/or between the making and storing of backup copies. Since it is not often that data needs to be restored from a backup copy, an inexpensive way of meeting both objectives is to backup the data on the computing device immediately prior to an imminent threat to data integrity. An imminent threat to data integrity can occur two ways. One way is a threat to the data storage media, e.g., the hard drive included in the computing device. The second is a malware invasion of the computing device. The present invention is directed toward providing protection against both types of imminent threats to the integrity of data stored on a computing device.

SUMMARY OF THE INVENTION

In accordance with the present invention, a method and apparatus, including computer-readable medium for preserving the integrity of the data stored on the storage component of a computing device is provided. Data integrity is preserved by detecting the occurrence of an imminent threat to data integrity and creating a backup copy of the stored data when an imminent threat is detected.

In accordance with other aspects of the present invention, the storage component is a computer-readable media, e.g., a tape or disc.

In accordance with further aspects of the invention, the imminent threat may be either a threat to system security, such as a malware infection, for example, or a threat to system integrity, such as a hard drive failure, for example.

In accordance with still other aspects of the invention, the backup copy may be made automatically, i.e., without user input, or may require user input in response to an event report.

In accordance with yet another aspect of the present invention, the imminent threat events may be detected by the operating system of the computing device, a program operating on the computing device, or a service provided by another computing device or computing system that communicates with the computing device via a connected or connectionless network.

In accordance with other aspects of the present invention, depending on implementation, the computer-readable media on which the backup copy is stored is a non-removable storage component of the computing device, a non-removable storage device externally connected to the computing device, a removable storage component of the computing device, or a removable storage device externally connected to the computing device. The computer-readable media on which the backup copy is stored may exist on the same or another computing device and accessed via a wired or wireless connection. The computer-readable media on which the backup data is stored may be any suitable magnetic or optical recording media, such as a compact disc read-only memory (CD-ROM), digital versatile disc (DVD), magnetic cassettes, magnetic tape, magnetic disc storage, etc., or any other medium used to store data and accessible by a computing device.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
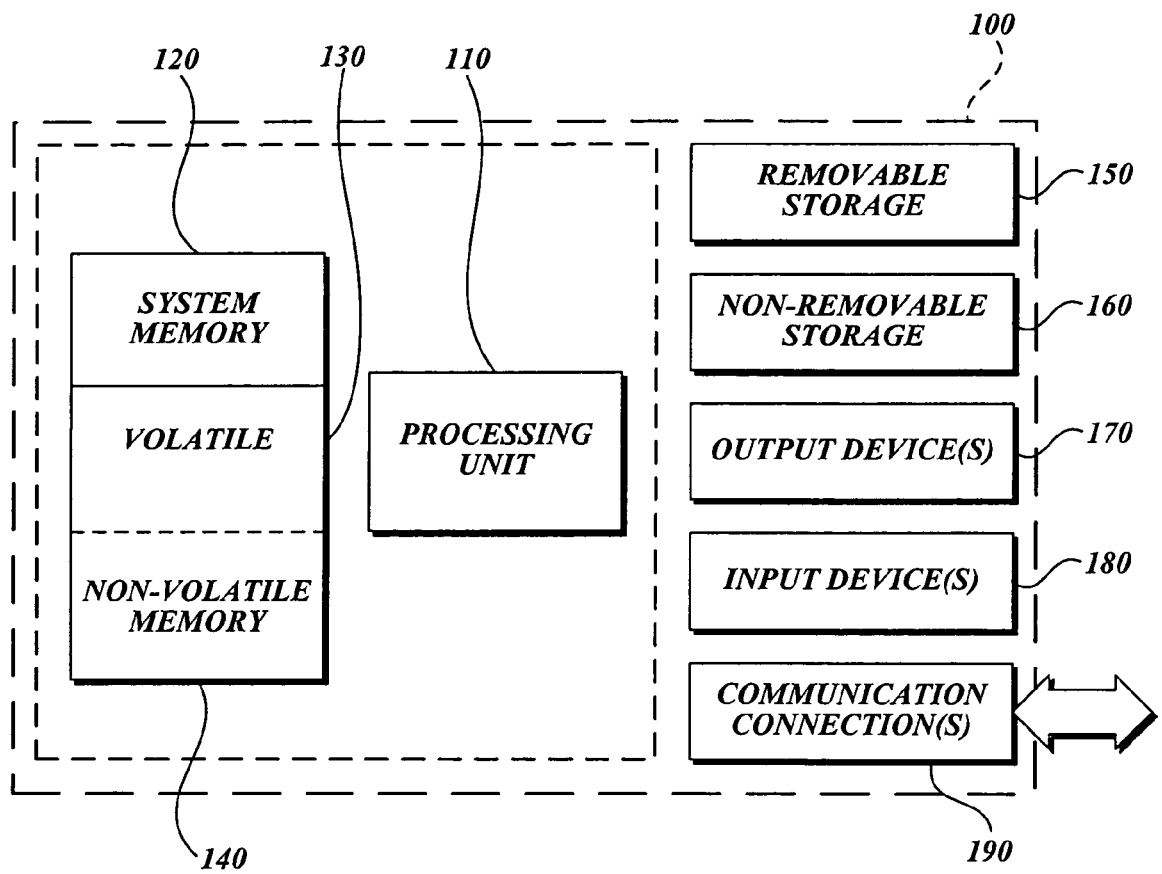
FIG. 1 is a block diagram illustrating the major components of an exemplary computing device.

FIG. 1 and the following discussion are intended to provide a brief, general description of a computing system suitable for implementing various features of the invention. While the computing system will be described in the general context of a personal computer usable as a standalone computer, those skilled in the art will appreciate that the invention may be practiced with many other computer device configurations, including multi-processor systems, mini computers, mainframe computers, and the like. In addition to the more conventional computer systems described above, those skilled in the art will recognize that the invention may be practiced on other computing devices including laptop computers, tablet computers, and other computing devices that may include a graphical user interface, at least one non-removable storage unit, i.e., a hard disc, and a removable storage unit and/or a network connector.

With reference to FIG. 1, an exemplary computing system for implementing the invention includes a computing device, such as device 100. In its most basic configuration, computing device 100 typically includes a processing unit 110 and system memory 120. Depending on the exact configuration and type of computing device, system memory 120 may include volatile memory 130 such as RAM, non-volatile memory 140 such as ROM, flash memory, etc., or some combination of the two. Additionally, the computing device 100 may include mass data storage (removable storage 150 and/or non-removable storage 160) such as magnetic or optical discs or tape. Computing device 100 may also include one or more input devices 180, such as a mouse or keyboard, and/or output devices 180, such as a display. The computing device 100 may further include network connections 190 to other devices, such as computers, networks, servers, etc., using either wired or wireless media. Controlling all of the aforementioned devices is the processing unit 110. Because all of these devices are well known in the art they are not discussed further here.

Computing device 100 typically includes at least some form of computer-readable medium. Computer-readable media can be any available media that can be accessed by computing device 100. By way of example, and not limitation, computer-readable media may comprise computer data storage media and communication media. As noted above, computer data storage media includes volatile and non-volatile, removable and non-removable computer-readable instructions, data structures, program modules, or other data. Computer data storage media includes, but is not limited to, RAM, ROM, EEPROM, flash memory, or other memory technology, CD-ROM, DVD, or other optical storage, magnetic cassettes, magnetic tape, magnetic disc storage, or other magnetic storage devices, or any other medium which can be used to store desired information accessible by computing device 100. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to include information in a signal. By way of example, and not limitation, communication media includes wired media, such as a wired network or direct wired connection, and a wireless media such as acoustic, RF, infrared, and other wireless media. Combinations of any of the above should also be included in the scope of computer-readable media.

In an exemplary embodiment of the invention, the computing device described above responds to an imminent threat event. Those skilled in the art will appreciate that an event is an asynchronous occurrence that is associated with an event receiver and placed in an event queue for retrieval by the receiver, in this invention a threat event response software component. An imminent threat event as used in this description is an imminent threat to the data integrity of the computing device such as a security attack or a hardware failure. Security attacks include, but are not limited to, denial of service attacks, rogue programs, and computer software viruses, worms, and Trojan horses. Hardware failures include, but are not limited to, the failure of the storage component of a device, such as the removable storage unit 150 and/or the non-removable storage unit 160, for example. Elevated file seek errors, corrupted sectors or high disk access times are examples of detectable imminent hardware failure threats.

Figure 2:
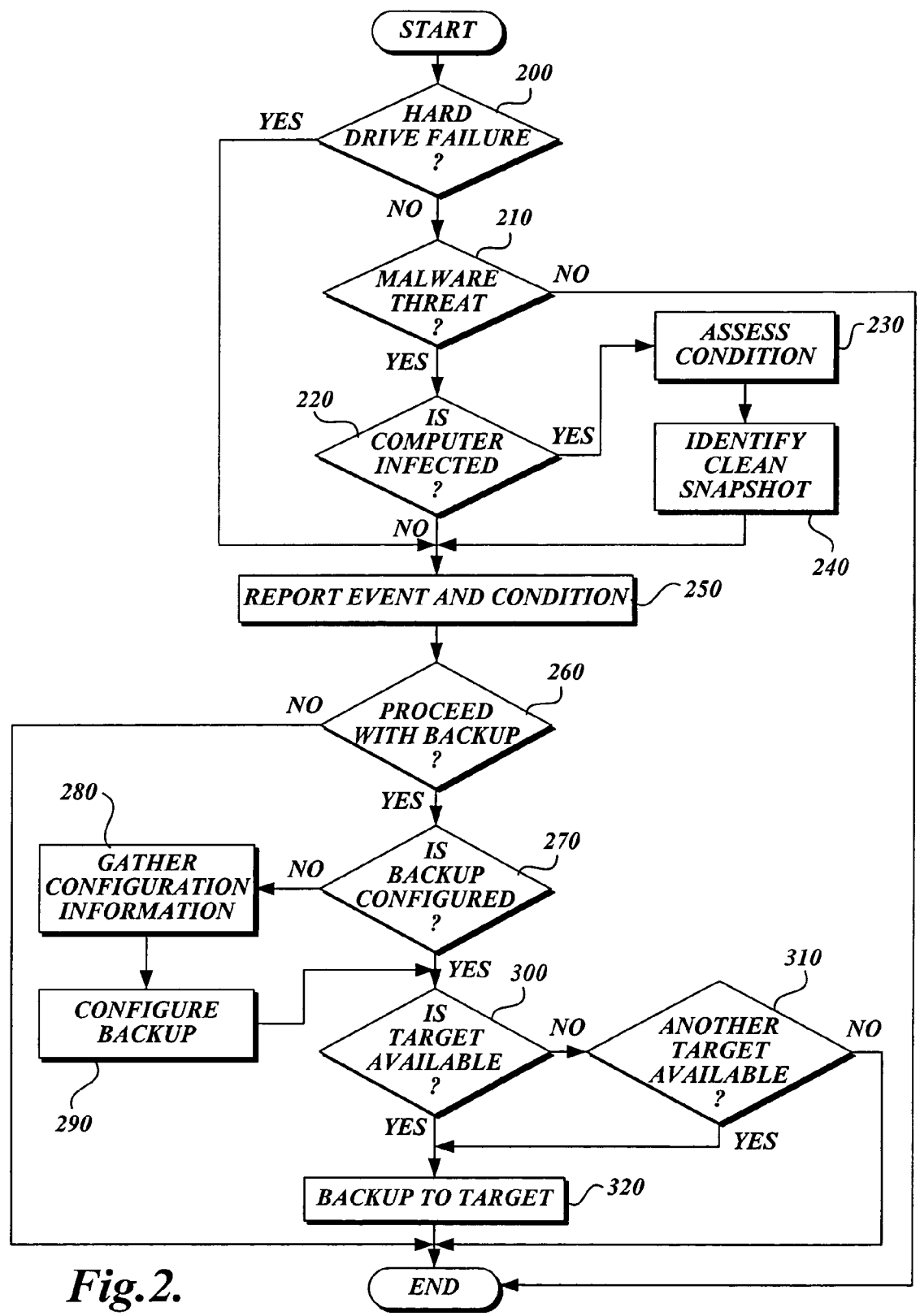
FIG. 2 is a flow diagram showing an exemplary threat event-driven backup process formed in accordance with the invention.

FIG. 2 is a flow diagram showing how the exemplary computing system described above running an exemplary embodiment of the invention, responds to an imminent threat event. Threat events are issued by a trusted source such as, but not limited to, the operating system of the device, an antivirus program running on a device, or an antivirus service running on another computing system able to communicate with the computing device via a wired or wireless network. For ease of illustration and understanding, the two types of imminent threats—hard drive failure and malware—managed by the exemplary process illustrated in FIG. 2 are shown as a linear flow whereas in an actual embodiment of the invention, the detection functions depicted by the hereinafter described detection tests would be event driven.

Turning to FIG. 2, at block 200, a test is made to determine if a threat event relates to a hardware failure, in the case of the illustrated exemplary embodiment. As well-known to those skilled in the art, an imminent hard drive failure is indicated by various detectable events, such as file seek errors, corrupted sectors, or high disk access times, for example. If the threat event is not an event denoting a hard drive failure, at block 210, a test is made to determine if the threat event is a malware threat. Malware is software written and/or distributed with malicious intent to corrupt data or damage software on one or more computing devices. Examples of malware include, but are not limited to, computer viruses, worms, and Trojan horses. If the event threat is not a malware threat, the process ends. Contrariwise, if the threat event is a malware failure, at block 220 the computer is checked to check to see if data on the hard drive of the computing device has been infected or otherwise corrupted. This check is performed using standard malware detection software. If the data on the hard drive of the computing device is determined to have been corrupted, the process proceeds to block 220 where the condition of the data stored on the computing device's hard drive are assessed. Assessing the condition of the data stored on the hard drive of the computer device typically involves determining the scope of the malware infection using conventional software hard drive data evaluation programs.

After the condition of the data stored on the computing devices hard drive is assessed, the process tries to identify a clean (i.e., non-infected) snapshot of the data on the hard drive of the computing device. A snapshot is a point-in-time view of a media. Point-in-time views are created by a software component that tracks changes to the disc. For example, if a change is about to be made to a block that is needed for a snapshot, the old block is copied to a special area of the disc called the "DIFF" area. The snapshot of the disc is constructed by assembling the blocks in the DIFF area with the blocks on the live media. Those skilled in the art will appreciate that the foregoing description of a "snapshot" is exemplary and should not be construed as limiting.

After a snapshot that has been determined to be uninfected is identified, the process proceeds to block 250, where the threat event and the condition of the computing device are reported to the user of the computing device. Likewise, if a threat was a hard drive failure (test block 200) or a determination was made that the computer was not infected (test block 220), the process proceeds to block 250. The report of the threat event and condition of the computing device report (block 250) may be simply informational or may require user input for the process to proceed. That is, the threat event and condition of the computing device report may request the user to decide if a backup is to occur.

At block 260 a test is made to determine if a decision to proceed with the backup has been made. The determination can be made in response to user input, as described above, or automatically based on some criteria. For example, software carrying out the process illustrated in FIG. 2 could decide that making a backup copy is desirable if hard disk access time drops below some predetermined threshold, or if a malware threat cannot be alleviated by antivirus software stored on the computing device. If it is determined that no backup is to be made, the process ends. If it is determined that a backup is to be made, the process proceeds to block 270, where a test is made to determine whether backup is configured. Computer operating systems, such as Microsoft Windows XP contain backup software that requires configuration by a user. In many instances, the backup software is not configured by a user. In order for the process of the invention to function, backup software must be configured. Hence, the test at block 270. Backup system configuration requires the identification of a target medium to store backup copies of data. A target medium is a media on which backup data copies are stored. Usually the media is a burnable DVD or CD, or magnetic tape, the drive of which may be a component of the computing device, such as the removable storage device 150 illustrated in FIG. 1, or may be externally connected to the computing device. Media on which a snapshot may be stored also includes, but is not limited to an auxiliary disc drive, external disc drive or a storage area network (SAN), wired or wirelessly connected to the computing device.

Returning to FIG. 2, if at test block 270 it is determined that a backup has not yet been configured, at block 280, a user interface component such as a dialog box suitable for gathering configuration information is presented to the user. At block 280 the computing device uses the gathered configuration information to configure the backup.

A further backup has been configured and is ready to operate (block 290) or if the backup was previously configured (test block 270), the process proceeds to block 300 where it is determined if a target media is available. For example, the backup may be configured such that the data to be preserved needs to be written to a burnable CD. If there is no burnable CD in the CD recording drive, the system prompts the user to insert a burnable CD in the CD drive in order to proceed with the backup. Another example of an unavailable target medium would be another hard drive to write to that is no longer available.

If the normal or first in line backup media is not available, the process proceeds to block 310 where a test is made to determine if a secondary target medium is available. This test may or may not involve a user inquiry. If no target medium is available, backup cannot proceed and the process ends. If a target medium has been identified either at test block 300 or test block 310, the process proceeds to block 320 where a backup copy of the hard drive date is made to the target medium.

In summary, as will be readily understood from viewing FIG. 2 and the foregoing discussion, in the case of a hard drive failure, a backup copy is a copy of the data stored on the hard drive. In the case of a malware threat, the backup copy is clean. The backup copy is stored on a media of computer-readable media other than the main boot disc drive of the computing device affected by the threat event, i.e., the hard drive failure of the malware threat.

While the preferred embodiment of the invention has been illustrated and described, it will be appreciated that various changes can be made therein without departing from the spirit and scope of the invention as defined by the appended claims. For example, actual embodiments of the invention may allow a user to interact more directly with the process or less directly with the process. A user interface may be provided to enable a user to turn off or turn on various parameters that affect how a backup proceeds.

The embodiments of the invention in which an exclusive property or privilege is claimed are defined as follows:

1. A method of preserving integrity of data stored on a computing device, comprising:
    obtaining at least one event that indicates an imminent threat to the integrity of the data stored on a hard drive of the computing device, the imminent threat comprising a malware threat;
    in response to the at least one event, determining whether data on the hard drive has been corrupted by the malware threat;
    upon determining that the data on the hard drive has been corrupted, identifying a snapshot of the data that is not infected by the malware threat; and
    creating a backup of the data on the hard drive using the uninfected snapshot, the backup being created on a primary computer-readable storage medium other than the hard drive.

2. The method of claim 1, further comprising:
    obtaining another event that indicates an imminent threat to the integrity of the data stored on the hard drive due to an imminent hard drive failure; and
    creating a backup of the data on the hard drive, the backup being created on the primary computer-readable storage medium.

3. The method of claim 2, wherein the imminent hard drive failure is detected based on at least one of elevated file seek errors, corrupted sectors, or high disk times.

4. The method of claim 2, the malware threat includes at least one of a denial of service attack, a rogue program, a computer virus, a worm or a Trojan horse.

5. The method of claim 2, wherein the at least one event that indicates the malware threat includes a warning event issued from security threat detection software.

6. The method of claim 1, wherein the at least one event is generated by a trusted source, the trusted source including at least one of an operating system of the computing device, an anti-virus application of the computing device, or an anti-virus application on a remote system communicatively coupled to the computing device.

7. The method of claim 1, further comprising:
    determining whether the computing device is configured to perform the backup.

8. The method of claim 7, further comprising
    obtaining configuration information from a user to configure the computing device to perform the backup.

9. The method of claim 8, wherein the configuration information specifies the primary computer-readable storage medium on which to backup to the data.

10. The method of claim 9, wherein the configuration information further specifies a secondary computer-readable storage medium on which to create the backup when the primary computer-readable storage medium is unavailable.

11. The method of claim 8, further comprising configuring the computing device to perform the backup at least in part on the obtained configuration information.

12. The method of claim 1, wherein the backup is automatically initiated in response to the at least one event that indicates the imminent threat.

13. A computer-readable storage medium having stored thereon computer-executable instructions which when executed by a processor of a computing device perform a method, comprising:
    obtaining at least one event that indicates an imminent threat to the integrity of data stored on a hard drive of the computing device, the imminent threat comprising a malware threat;
    in response to the at least one event, determining whether data on the hard drive has been corrupted by the malware threat;
    upon determining that the data on the hard drive has been corrupted, identifying a snapshot of the data that is not infected by the malware threat; and
    creating a backup of the data on the hard drive using the uninfected snapshot, the backup being created on a primary computer-readable storage medium other than the hard drive.

14. The computer-readable storage medium of claim 13, further comprising notifying a user of the imminent threat.

15. The computer-readable storage medium of claim 14, further comprising:
  prompting the user to indicate if a backup is desired; and
  initiating the backup in response to an affirmative indication.

16. The computer-readable storage medium of claim 13, further comprising:

obtaining another event that indicates an imminent threat to the integrity of the data stored on the hard drive due to an imminent hard drive failure; and creating a backup of the data on the hard drive, the backup being created on the primary computer-readable storage medium.

\* \* \* \* \*

UNITED STATES PATENT AND TRADEMARK OFFICE
CERTIFICATE OF CORRECTION

PATENT NO. : 7,636,872 B2  Page 1 of 1
APPLICATION NO. : 11/089475
DATED : December 22, 2009
INVENTOR(S) : Carl M. Carter-Schwendler et al.

It is certified that error appears in the above-identified patent and that said Letters Patent is hereby corrected as shown below:

In column 6, line 34, in Claim 8, after "comprising" insert --:--.

Signed and Sealed this
Twenty-fifth Day of January, 2011

David J. Kappos
*Director of the United States Patent and Trademark Office*